Feb. 7, 1967      K. H. STEIGERWALD      3,303,319
METHOD AND APPARATUS FOR THE WORKING OF
MATERIAL BY RADIANT ENERGY

Filed Dec. 1, 1964      4 Sheets-Sheet 1

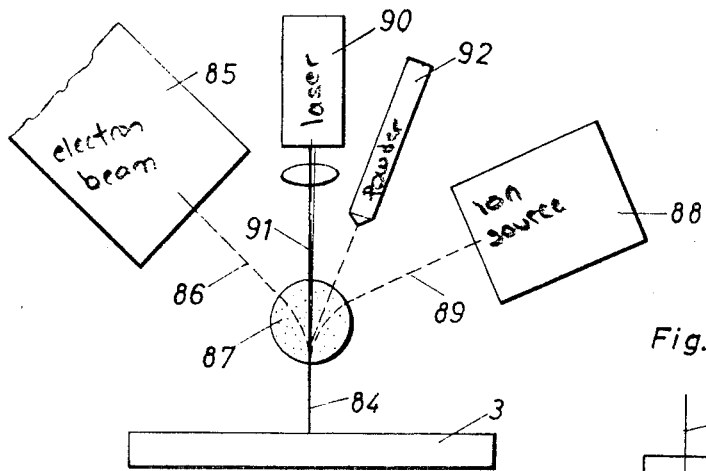
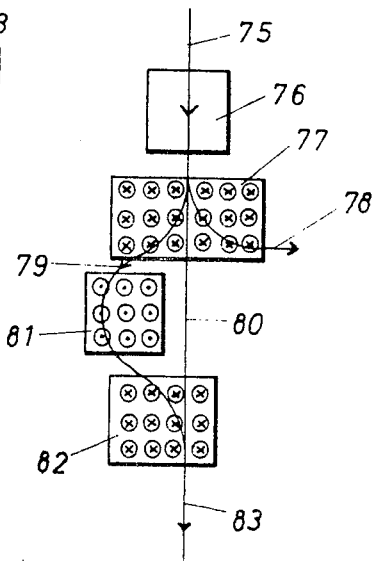
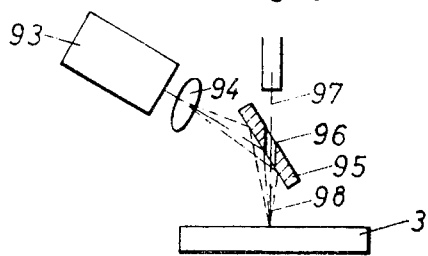
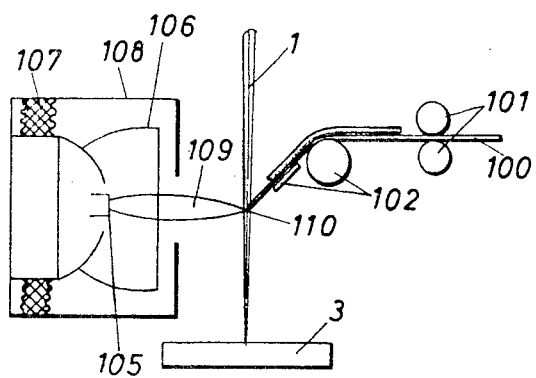

3,303,319
METHOD AND APPARATUS FOR THE WORKING OF MATERIAL BY RADIANT ENERGY
Karl Heinz Steigerwald, Schubertstrasse 8, Heidenheim (Brenz), Germany
Filed Dec. 1, 1964, Ser. No. 414,986
Claims priority, application Germany, Dec. 2, 1963, St 21,397
18 Claims. (Cl. 219—121)

This invention relates to an improved process and apparatus for thermal machining, which term is used to describe soldering, welding, cutting, annealing and the like and more particularly, relates to thermal machining using a composite radiant energy beam having at least two components, one of which is selected for modifying the chemical and/or physical properties of the material machined.

It is known that beams of charged particles such as electron beams can be used for thermal machining. This technique may be used for the various machining and treatment methods based on the use of thermal energy, such as the forming of a solid body or a workpiece by removing or building up material, the joining of different bodies by welding or soldering, separation by cutting, and finally the modification of material properties by various annealing processes. In the practical application of the different machining methods, the machining process is influenced by an appropriate selection of the effective working diameter of the beam, the beam intensity, and the timing and the positional characteristics of the beam. However, the machining process depends on the properties of the material to be worked. Here, not only the thermal properties of the energy used, but also the properties of the material as toughness, surface tension, electrical conductivity, ionization energy and others, are of importance to the optimum use of such processes.

As a result, machinability and results vary widely with the different materials. Similar to mechanical machining methods, the machinability of the different materials depends also on their properties when radiation of charged particles is used and may vary from good to poor. Since some of the effective material properties depend to a large extent on the composition of the material, minor changes in the composition of the material may lead to uncontrollable fluctuations in the result of the work.

Within certain limits, the different material properties can be taken into account by an appropriate selection of the aforementioned operating characteristics of the beam. Practical experience has shown, however, that these limits are relatively narrow and that practical machining with charged-particle beams is greatly hampered in many cases by poor machinability and non-uniformity of results.

The subject of the present invention is a machining process and device using radiant energy and substantially eliminating entirely the limits and drawbacks of previously known beam techniques due to material properties. By this invention, it is possible to modify certain material properties in the decisive phases of the machining process in such a manner that the machining process and its result can be optimally performed with practically any material and within considerably wider limits than has hitherto been the case. The material properties modified during machining shall for the purposes of this specification, be termed "physical properties" for simplicity of terminology, and encompasses such properties as hardness, surface tension, vapor pressure, carbide formation, toughness, ionization energy, electrical conductivity, intercrystalline corrosion, carbide decomposition, and a carbide reduction. As will be apparent from the specification, many of the modifications of such properties involve chemical reactions and/or reactions which are often studied in terms of chemical reaction and which result in the modification of the physical properties. Also, since the properties are modified during transition between different phases of the material, it is even more difficult to determine with precision when the modification is a chemical change and when it is a physical change. Therefore, it is intended that the term "physical properties" embrace such chemical reactions and/or changes within its scope.

It is, therefore, an object of the present invention to provide improved processes and apparatus for practice thereof for thermal machining in which the characteristics of the material machined are modified during the machining process to improve the efficiency and versatility of thermal machining.

It is another object of the present invention to provide an improved method and apparatus for thermal machining using a composite beam formed of a beam component to supply thermal energy and a beam component to modify the physio-chemical properties of the material.

Other objects and advantages will be pointed out hereinafter.

Briefly, the invention is based on the discovery that in thermal machining by the known beam technique, the reactions which are determinative of the results of the work are limited to a very thin layer within the region of the effective beam diameter, as well as directly to the surface hit by the beam. If it should be possible favorably to modify the material properties within this region (particularly during the machining process), the machining process as such could be influenced favorably. This applies above all to the techniques in which material is removed as well as to welding where transitions of the material into its different states occur in the working zone. In these cases, the addition of traces of appropriate substances will be sufficient for introducing a considerable change into the processes occurring in the transition zones between the different states of matter.

The invention, thus, covers above all a machining process using radiant energy. In accordance with the invention, a beam consisting of at least two different components is directed to the work area, preferably at least one component of said beam providing the required impinging energy and one or more of the other components modifying the physio-chemical properties (by which term is meant the chemical and/or physical properties) of the material in the desired manner. For machining purposes, one or more of the beam components are preferably chosen so that they will modify the chemical and/or physical properties of the material in such a manner that the machining effect produced by at least one other beam component is influenced favorably. The beam components are therefore used to introduce substances which will modify the properties of the material in the desired manner. As was mentioned above, minute traces of such substances are frequently entirely sufficient. Such minute traces will not produce any permanent changes in the material, but only temporary ones.

Apart from the influence on the machining effect proper, the new process can also be arranged in such a manner that permanent changes are produced in the material within the work area or that an undesirable change in the material produced by the machining process is compensated entirely or partly.

In the process according to the present invention, the thermal energy for machining of the material is primarily supplied by means of a component of the beam consisting preferably of electrons or electromagnetic radiation such as light. The other beam component preferably consists of particles which, for the purposes of this specification, encompasses the use of pulverized material injected into the composite beam, the molecules of such material, and neutral and ionized elemental particles (atoms and ions) of such material. Usually, the other component will be a mixture of the "particles" so defined although, as will be evident from the specification, discreet selection may be made in some applications.

In the following, the details of the new process are explained with the aid of a few examples.

As a first example, let us consider a so-called deep penetration welding. For deep penetration welding, a beam of charged particles—preferably an electron beam—is focused on the seam and its power density chosen sufficiently high for the beam to penetrate deeply into the material by forming a narrow, highly heated zone. The beam, thus, transmits its energy over the entire depth of penetration directly to the material. A weld zone is, thus, created whose depth-to-width ratio is high, and above all higher than 3:1. When the beam of charged particles penetrates into the material, the material in the zone of penetration is evaporated, i.e. a capillary is formed which is filled with the vapor of the material, its walls being formed by molten material. Of decisive importance for the process of deep penetration welding is the surface tension of the molten material. A high surface tension requires a correspondingly high vapor pressure in the capillary for maintaining the free space within the capillary needed to allow the beam to pass. It is, therefore, necessary to choose a beam density which is sufficiently high for creating the necessary temperature within the capillary.

The value of the surface tension effective in the cavity is, for all practical purposes, dependent upon on the material forming the interior surface of the capillary proper. Consequently, the prevailing properties will, as a rule, be those of the welded material. However, if the interior surface is covered by a foreign substance which is only one or a few atomic layers thick, the property of this substance will prevail and modify the effective surface tension accordingly. Thus, if the deep penetration weld is not performed with a pure electron beam as has hitherto been the custom, but with a combined beam of electrons and a component of appropriate atoms or ions, the atoms or ions will reach at least part of the capillary walls and form a layer of considerable influence on the surface tension, provided that they are properly concentrated in the beam.

Due to the fact that the capillary moves along the weld during welding, the irradiated substance is primarily concentrated on that surface of the capillary's wall which lies in the direction of its movement. This leads to a non-uniform distribution of the irradiated substance over the surface of the capillary. Consequently, the surface tension is reduced more in that portion of the capillary's wall which has been enriched with the irradiated substance, while this effect gets gradually weaker towards the opposite side of the wall. This non-uniform distribution of surface tension favors a liquid flow around the capillary, which is produced by the forces set free by the variations in surface tension about the capillary wall and the attempting compensation thereof by the material. The material thus flowing around the capillary is not limited to the surface alone, but due to the viscosity of the liquid, extends also to deeper lying zones. Since the motion of the capillary in the welding processes known to the art is achieved primarily by evaporation of material from the lead wall and depositing thereof on the trailing wall, it can be seen that the amount of material to be moved by evaporation is reduced considerably by the present process. In other words, the energy of electron radiation required solely for material movement by evaporation is eliminated, so that the total energy needed for the welding operation is reduced.

The necessary concentration of the atomic radiation depends primarily on the dwell time of the atoms in the surface of the capillary and the movement of the capillary through the material during the welding operation. Since only one or a few atomic layers are required in order to attain the desired effect, the radiation carries only an extremely small amount of said substance which in the majority of cases does not produce any noticeable permanent change in the properties of the welded material. The working process can be improved above all with respect to the following two points:

On the one hand, as was mentioned above, a considerable reduction of the total energy of radiation required for deep penetration welding may be achieved. This in turn means a greater potential depth of penetration or a higher welding speed as well as a further reduction of the energy required per weld area. A second, technically very important effect is the elimination of variations in the composition of the material and the resultant instability of the welding process and its result.

In principle, the new process will also make it possible to reduce the required welding energy if at least one of the additional components of the beam of matter exerts a sufficient radiation pressure on the material in the work area. It is, thus, possible to utilize the radiation pressure to shift the transport of material practically entirely to the flow around the capillary, avoiding evaporation through the walls of the capillary. Theoretically, the total energy required for welding can, therefore, be limited to the amount of energy needed for melting a thin layer of material around the capillary.

The aforementioned effects indicate that, for example, the depth of penetration can likewise be influenced by the composition of the beam. It is, thus, evidence that the combined beam offers a multitude of possibilities for creating optimum working conditions and for making the process largely independent of the properties of the material to be processed. The new technique, thus, offers the necessary conditions for a far reaching technical control of the machining process, which is not available in the method using an electron beam or a charged particle beam only.

As a second example, lets us consider the welding of an 18/8 chrome-nickel steel where the danger of intercrystalline corrosion is to be avoided. For this purpose, a beam is used which in addition to the energy carrier contains an appropriate component of Nb-atoms or ions. The radiation is applied in such a manner that the Nb-component reaches and binds the carbon in the weld zone before chromium carbide is produced. The same technique permits an existing formation of chromium carbide to be reversed. For this purpose, a deep penetration weld is applied to the corresponding area of the workpiece with the aid of a composite beam as covered by the present invention, which contains an appropriate component of harmless, carbon-binding radiation. Larger areas can be properly scanned and treated in this manner.

As a third example, let use consider the hardness loss in welds in austenitic steels. This is generally the result of a decomposition of carbides during the welding operation. In this case, the beam is given an adequate component of C-atoms, which on account of the C-enrichment leads to the formation of new carbides in the weld zone and, thus, compensates for the loss in carbides. A hardness loss and the resultant weakening of the material in the weld zone is, thus, avoided.

In like manner, an increase in hardness in the weld zone, as is to be expected in the welding of hardenable steel, can be avoided with the aid of carbon-binding or eliminating radiation.

The new process can also be used for solving a large number of other problems encountered in machining with the aid of radiant energy.

The present invention also covers devices for generating said composite beam. Although these devices may be of different design, they are all based on the same working principle, viz. that at least two different types of radiation are combined to form a beam which is focused on the workpiece.

Having briefly described the invention, it will be described in greater detail in the following detailed description which may best be understood by reference to the accompanying drawings, of which:

FIG. 6 is a diagrammatic view of a device for generating a beam consisting primarily of electrons and atoms.

FIG. 7 is a schematic view of a device for generating a beam consisting of light, electrons, ions and atoms.

FIG. 8 is a diagrammatic view of a device for generating a laser beam combined with an atom beam; and FIG. 9 is a partially sectioned view of still another embodiment for generating a combined atom-electron beam.

Figure 1:
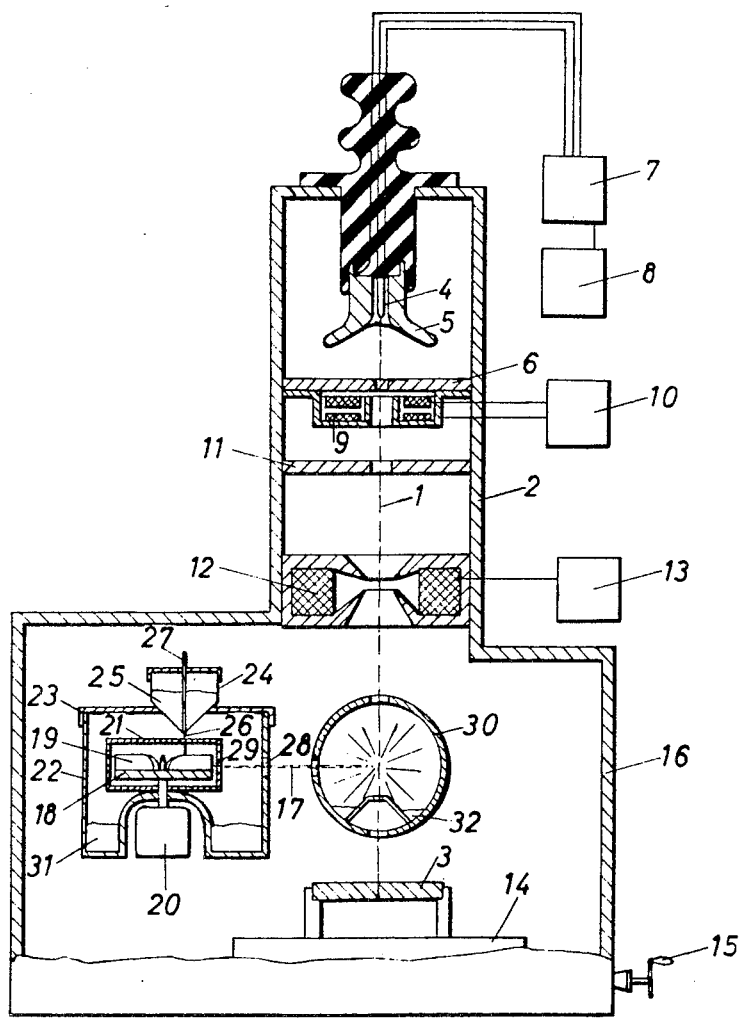
FIG. 1 is a cross section view of apparatus for generation of a composite radiant energy beam having an electron beam component and an atomic particle beam component.

FIG. 1 shows a simple device for generating a combined beam of electrons and atoms which comprises an electron beam column 2 for the generation of an electron beam 1. The electron beam gun of this unit consists of the cathode 4, the control electrode 5 and the grounded anode 6. Circuits 7 and 8 generate the filament voltage for cathode 4, the bias voltage for control electrode 5, and the high acceleration voltage. An electromagnetic deflector system 9 for beam deflection is located below the anode 6. The power supply system 10 feeds the deflector system 9. Below the system 9, a diaphragm 11 is arranged which can be shifted in its plane by conventional mechanical means (not shown in the drawing). The electromagnetic focusing lens 12, whose power supply unit is marked 13, serves for focusing the electron beam 1 onto the workpiece 3. The workpiece itself is supported by the mechanical stage 14, indicated schematically, which can be shifted from left to right by means of crank 15, and back and forth by another crank (not shown).

The work chamber 16 contains means for shooting a beam of matter 17 into the electron beam 1. The means 16 comprises a rapidly rotating propeller wheel 18 with vanes 19 on its upward-facing side, which is made to rotate with high speed in a housing 21 with the aid of a motor 20. The speed of said wheel can be controlled by appropriate, conventional means. The entire assembly is contained in a housing 22, the upper opening of which is closed by a rotatable cover 23. This cover incorporates a funnel-shaped reservoir 24 holding the pulverized material 25 intended for the beam of matter. The lower end of the housing 24 has a tiny bore 26 which can be opened and closed by a movable needle valve or pin 27. In addition, the housing 24 is inserted eccentrically into the rotatable cover 23, so that the position of housing 24 with respect to the angular position of wheel 18 can be changed by turning the cover 23. The housing 22 has a slot 28 which is opposite a slot 29 in housing 21. Both slots are oriented so that the beam of material 17 formed from the particles of the material 25 due to the centrifugal force produced by wheel 18 passes through them and penetrates the electron beam 1 perpendicular to its axis. When the particles of the beam of material 17 reach the intensive electron beam, much or all of the material is highly heated instantly and evaporates. The intersection of electron beam and beam of material, thus, represents a source of atom radiation from which the atom rays spread out in all directions. That portion of the radiation following the beam concentrically is selectively passed by the spherical shield 30 and reaches the workpiece 3 together with the electrons. The housings 22 and 30 are designed so that the material, which is not transmitted in the desired direction of the beam of material or the electron beam respectively, is intercepted and can be stored in a chamber below. The stored material is marked 31 and 32.

Figure 2:
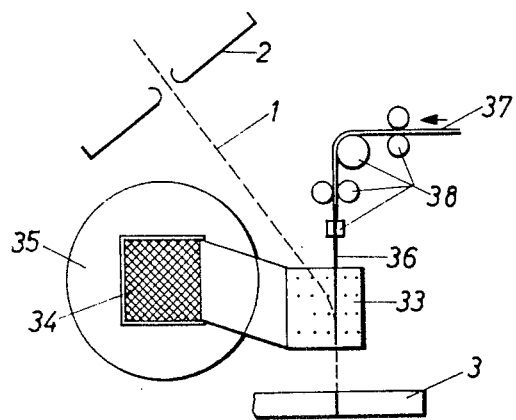
FIG. 2 is a partially sectioned, schematic view of another device for combining an electron beam with an atom beam.

FIG. 2 shows another practical example of a device for generating an atom beam within the electron beam 1 impinging on the workpiece. Here also, the electron beam 1 is generated by a unit 2, indicated schematically, which however, contrary to FIG. 1, is inclined at an angle of about 45° to the surface plane of the workpiece 3. A magnetic deflection field produced between the pole pieces 33 with the aid of the magnetic yoke 34 and the coil 35 deflects the electron beam so that it strikes the workpiece 3 vertically. It is now possible to inject material in solid, liquid, vaporous or any other state into the beam 1 in the direction of axis 36 which coincides with the axis of the electron beam impinging on the workpiece. Thus, for example, FIG. 2 shows a wire 37 being introduced into the beam 1 with the aid of the drive and deflecting rollers 38, where part of the material evaporates forming an atom beam. This beam reaches the workpiece 3 together with the electron beam 1.

The device illustrated in FIG. 2 has the advantage that the added substances are transported from a low current-density part of the electron beam into the working spot with its high current-density on the workpiece. This produces a particularly intensive interaction between the added substance and the electron beam, which takes place in the direct proximity of the work area proper. Depending on the kind of substance added (e.g. with vapors and gases), this interaction may also be relatively low in the case of very fast electrons. In this case, a very high percentage of the added substance is guaranteed to reach the work area in the form of neutral atoms.

Figure 3:
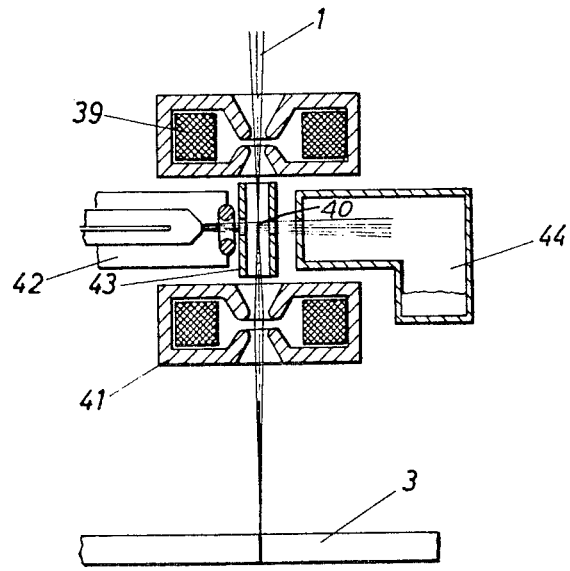
FIG. 3 is a cross section of a portion of a device for generating an electron beam containing a particularly high portion of atoms.

If the added substance is to be heated to a particularly high temperature by the primary electron beam 1, this can be achieved advantageously by prefocusing the electron beam with the aid of a two-stage focusing system and introducing the substance in the first focus. Such a device is shown in FIG. 3. The electron beam generated by a conventional generator is focused by a short-focus magnetic lens 39, and the focus 40 is imaged on the workpiece 3 by an additional long-focus magnetic lens 41. By means of a conventional electrostatic spraying system 42, a substance may, for example, be pulverized, is injected through a cylindrical shield 43 with a slot into the focus 40 of the beam 1. The non-evaporated portion of the substance is collected in the storage vessel 44. The device shown in FIG. 3 makes it possible to achieve extraordinarily high temperatures and, thus, high speeds of the atom beam.

Figure 4:
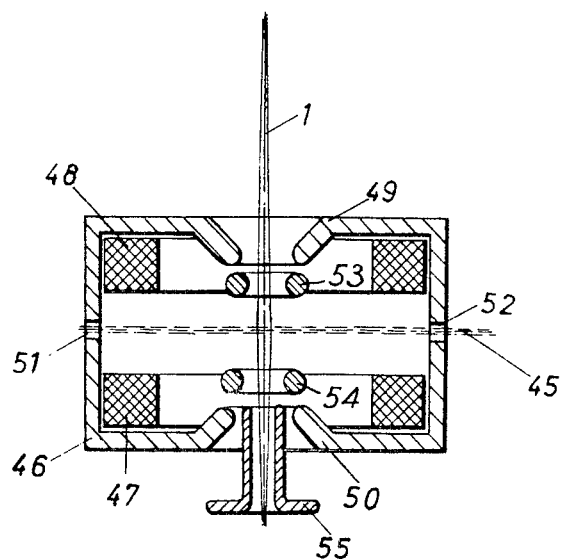
FIG. 4 is a partial section through a device for generating a combined electron/ion beam.

An additional ionization of the neutral atom beam will frequently be found advantageous. Such an ionization can be obtained by a gas discharge ignited in the intersection area of electron and atom beams. FIG. 4 shows an example. For greater clearness, only the primary electron beam 1 and a beam of matter penetrating it are indicated. A magnetic lens 46, whose magnetic winding is split up into the two coils 47 and 48, is shown in a concentric position in relation to the electron beam 1. Perpendicular to the axis, this lens is provided with rotationally symmetric pole pieces 49 and 50 between which the magnetic field is produced. Between the two openings 51 and 52 for the passing beam of matter 45 provided in the magnetic lens, there are two concentric electrode rings 53 and 54 between which a gas discharge is ignited by applying a voltage. The ions produced by this gas discharge are sucked off through a cathode tube 55 of non-magnetic material and will move concentrically with the electron beam towards the workpiece. The applied potentials should preferably be arranged in such a manner that the cathode 55 is at zero potential, while the magnetic lens 46 together with the electrodes 53 and 54 is maintained at a positive potential relative to ground. At least one of the electrodes 53 or 54 should be designed as a hot cathode. Electrode 53 may, for example, be designed as a hot cathode with a potential difference of about 500 v. between it and electrode 54, electrode 54 as an anode being positive in relation to electrode 53. In this case, the magnetic lens 46 with its housing and the pole pieces is maintained at the same potential as the electrode 53. This makes it possible to ignite a particularly uniform gas discharge of controllable intensity at the intersection of beams 1 and 45, from where the positive ions thus produced are sucked off very efficiently through the cathode 55. The magnetic field between the pole pieces of the magnetic lens 46 is set for optimum conditions of ionization in the space of intersection of beams 1 and 45. If convenient, the magnetic lens 46 may also be used for focusing the electron beam 1.

The device illustrated in FIG. 4 has the advantage that the ion content of the atom beam produced by the mutual penetration of the electron beam 1 and the beam of matter 45 can be varied and kept small or large, as desired, by switching the gas discharge on or off, or by varying its intensity.

Figure 5:
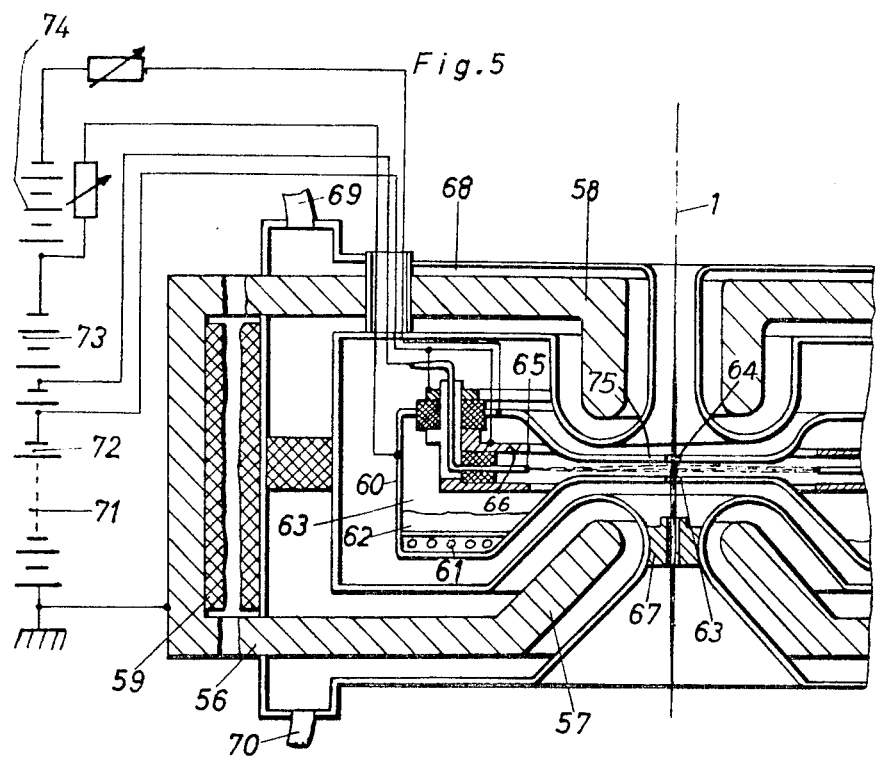
FIG. 5 is a partial section through another device for generating a combined electron/ion beam.

If a very large portion of ions is desired in the combined beam, the device of FIG. 5 may advantageously be used. In this figure, 56 is an electromagnetic focusing lens arranged concentrically relative to the electron beam 1, 57 and 58 being its pole pieces and 59 its magnetic winding. In this case, the primary electron beam 1 penetrates a source of ion radiation which is likewise arranged concentrically relative to it within the magnetic lens 56. This source of ion radiation consists of a housing 60 whose annular bottom can be heated by means of the heater elements 61 and which is designed in such a manner that a substance 62 intended for evaporation will produce a certain vapor pressure within the space 63, which is determined by the temperature of the heater elements 61 and which extends to the openings 63 and 64. A ring cathode 65 is arranged in such a manner within a metal ring 66 maintained at cathode potential that an electron charge generated between the cathode 65 and the housing 60 acting as an anode will be oriented concentrically in the direction of the space between the openings 63 and 64. The vapor in space 63 is, thus, ionized intensively, and the ions can be sucked off through the cathode 67 which serves as an accelerating electrode. The magnetic lens is thermally protected against the high temperature generated by the heater elements 61 by a water-cooling system with inlet 69 and outlet 70.

The suction cathode 67 should preferably be connected with the cooling system and maintained at zero potential. The housing 60 must, therefore, be given a positive potential of a few kv. relative to earth by means of a voltage supply 71, 72, 73. Within this system, the cathode 65 is in turn maintained at a negative potential of a few hundred v. relative to the housing 60 by the power source 73. The metal ring 66 is negatively biased against the cathode by the power supply 72. The power supply 74 is used to bias the cover 75 positively against the housing, said cover 75 being insulated against the rest of the housing 60. The ion beam is, thus, given a preferred direction towards the electrode 67.

The entire system is an extremely efficient source of ion radiation which directs an intensive ion beam on the workpiece due to the high field strength towards the suction electrode 67 produced in the proximity of the discharge space between 63 and 64.

The magnetic lens 56 is preferably used as a focusing lens for the electron beam 1, while the ion beam may, if necessary, be focused by an additional electrostatic or magnetic system. In this connection, mention should be made of the fact that with a speed of electrons in beam 1, for example, 100 kv. the electrostatic and magnetic effects of the ion-beam focusing systems on the electron beam can be kept low if the ion speed does not exceed a few kv.

If a high speed atom beam is to be focused sharply on the workpiece, such a beam can be obtained from an ion source if the ions emerging from the source are deflected in a magnetic or electric field after they have traveled a certain distance. The particles which have recombined before reaching the deflection point and which are, thus, electrically neutral again, will then continue to follow a straight path as a focused beam without being influenced by the magnetic or electric field. The recombination of positive ions with electrons can be improved by means of very slow electrons fed to the beam before it reaches the deflecting field.

FIG. 6 is a schematic representation of the separation of ions from a combined ion-electron beam, leaving only an electron beam with essentially neutral atoms. The combined ion-electron beam 75 traverses a space 76 penetrated by very slow electrons and reaches a magnetic field 77 directly perpendicularly to the drawing plane. In this case, the ions are deflected to one side in the form of an ion beam 78 and the electrons to the other side in the form of an electron beam 79, while a beam of neutral particles 80 continues its path without being influenced by the magnetic field. Whereas the ion beam 78 is not used any further with the ions being intercepted if necessary by a grounded shield, the electron beam 79 is deflected back by a second magnetic field 81 arranged perpendicularly to the drawing plane, but in opposite direction to field 77, and deflected once more into the path of the beam 80 of neutral particles by means of another magnetic field 82, the direction of which in turn is inverted relative to 81, thus, lying perpendicularly to the drawing plane again. Thus, there emerges from the magnetic field 82 a combined electron-atom beam 83 whose atoms primarily remain neutral.

FIG. 7 is a schematic diagram of a device for generating a beam composed of different types of radiation. A unit 85 designed for generating an electron beam and inclined 45° to the surface of the workpiece shoots an electron beam 86 into a magnetic field 87 directed perpendicularly to the drawing plane, said magnetic field being capable of deflecting the electron beam in such manner that it hits the workpiece 3 vertically. An ion source 88 is also inclined 45° to the workpiece and arranged on the other side of the magnetic field 87 and shoots a positive ion beam 89 into the magnetic field, said ion beam being introduced concentrically into the electron beam 86 due to the deflection, which is now effective in the opposite direction. A laser system marked 90 is arranged vertically above and directs a light beam 91 onto the workpiece perpendicularly through the magnetic field 87 and concentrically to the combined ion-electron beam. In this case, a combination of three different types of radiation is, thus, used. In addition, there is a possibility of introducing neutral atoms into the beam 84, which may be fed to the common axis of the three existing types of radiation, for example, by injection in the form of an evaporable, pulverized substance via nozzle 92.

In principle, the light may also be introduced at a certain inclination to the final direction of incidence on the workpiece. FIG. 8 shows a device making allowance for this modification. In this case, the laser beam is inclined 45° to the workpiece 3 and directed to a mirror 95 by means of an optical system 94 arranged in front of the laser 93, said mirror deflecting the laser beam perpendicularly to the surface of the workpiece 3. The mirror has a vertical bore 96 through which a fine wire 97 is concentrically fed to the laser beam 98 directed perpendicularly to the workpiece. Said wire evaporates in the laser beam, and a source of atom radiation is, thus, formed, which partially emits radiation concentrically to the laser beam and perpendicularly onto the workpiece 3.

FIG. 9 shows a device in which the material required for generating the additional atom radiation is fed with the aid of a wire 100 introduced into the electron beam 1 via drive rollers 101 and a deflection system 102. The wire 100 is introduced into the electron beam 1 in an area of low beam density, which may be facilitated by choosing a large aperture of beam 1 hitting the workpiece 3. The density of the electron beam 1 reaching the wire 100 is not sufficient for evaporating said wire; furthermore only a negligible portion of the density of electron beam 1 is absorbed by wire 100 within the relatively large cross section of beam 1 in which said wire is located. Thus, practically the entire energy of the electron beam 1 is available for machining the workpiece 3. For evaporating said wire 100, a second electron beam 109 is used, which as is shown in FIG. 9, is generated within an accelerating system by means of a cathode with a large emitting surface. The system consists of cathode 105 and bias electrode 106. It is arranged in an anode housing 108 with the aid of an annular insulator 107. The entire housing can be oriented in such a manner by means of mechanical adjusting devices not shown in the illustration that the electron beam 109 is focused on the point of the wire 100 which is, thus, evaporated.

A special advantage of the device described above is the possibility of controlling the atom beam very exactly and independent of the primary electron beam. By using a pulsed electron beam 109, it is, thus, possible to achieve a pulsed or otherwise controlled atom beam similar to the intensity control applicable to electron radiation. With an appropriate arrangement, the geometry of the evaporating wire point 100 can be made to exert a certain directional effect on the generated vapor beam, guiding it in the direction of the work area on the workpiece 3.

In order to reduce the surface tension in deepwelding workpiece capillaries produced by the beam with an arrangement of the type shown in FIG. 2, it may, for example, be advisable to inject pulverized magnesium or a mixture of magnesium and aluminium through a nozzle into the electron beam 1, instead of using the wire 37. A similar effect can be obtained if magnesium or a magnesium-aluminium alloy is chosen, e.g. for wire 100 in FIG. 8.

An example for the working range of the equipment using combined beams for machining purposes may be given by the following. For welding purposes an apparatus like that shown in FIG. 5 uses an electron beam 1 of 80 kv. and 20 ma., 1.6 kw. power. The electron beam is focussed by the electromagnetic lens 56 to a spotsize of 0.2 mm. diameter in a distance of 150 mm. from the center of the lens. The annular bottom of the housing 60 of the ion source is heated to a temperature of 650° K., and the substance 62 which may be Zn produces a vapor-pressure of $4 \cdot 10^{-2}$ torr. within the space 63.

The ring cathode 65 is by means of the voltage source 73 on a potential of $-600$ v. against the housing 60, acting as an anode with an upper disc insulated from the bottom disc. The potential of the upper disc differs from that of the lower disc by $+50$ v. by means of the voltage source 74. The metal ring 66 is on a potential of $-30$ v. against the ring cathode 65 by means of the voltage source 72. The current of the radial electron beam between 65 and 60 is 100 ma. The vapor is space 63 is ionized intensively and between the upper and lower disc of the housing 60 is generated an ion current of 20 ma. through the source 74. By means of a positive potential of the housing 60 of 10 kv. against the grounded suction cathode 67, an ion current of approximately 4 ma. is separated from the space 63 and directed together with the electron beam on the workpiece. On the way to the workpiece, approximately 50% of the ions will recombine, which gives an equivalent number of neutral atoms reaching the workpiece.

The approximate number of charged and neutral atoms reaching the machining area at the workpiece is in the range of $10^{16}$ to $10^{17}$ per second. The atoms stay for a short time at the surface of the working area and are sufficient to change the average surface tension for instance in the case of a CrNi-steel from approximately 1500 to 700 dyn./cm.

If the machining and especially welding beam is moved at a speed of 10 mm./s., the difference of the surface tension at the part of the wall of the deepwelding capillary which is directed to the direction of the movement remains on this low value, whilst the opposite wall reaches in average the value of approximately 1500 dyn./cm., that is the value of the original CrNi-steel. This difference causes a stream of molten metal along the outside of the capillary and normal and symmetrical to its axis, opposite to its movement. By these means the power and power density for a deepweld can be reduced at a given welding speed and penetration in the range of 30 to 70%. This means, that the limitation of the minimum power density, which was believed to be needed in the case of the natural electron beam deepwelding effect, is overcome by technical measures.

An example for the working parameters of an arrangement according to FIG. 8 can be given as follows. The machining purpose is the drilling of holes in a tungsten sheet. A Mg-wire of 0.1 mm. diameter is moved into the laser beam during operation with a speed of 0.5 mm./s. and vaporized. The laser is working at an impulse power of $10^4$ w., the beam of a wave-length of 6943 A. is focussed by optical means at the workpiece to a spot of 35 µm. diameter and reaches a power density of approximately $10^9$ w./cm.$^2$. The impulse duration is $5 \cdot 10^{-4}$ s., the frequency is 10 cycles for a time of several seconds. The use of Mg in relatively high quantities results at the high working temperatures at tungsten in the generation of a considerable vapor pressure which supports the drilling action while the Mg is removed by the drilling itself.

In order to reduce a hardness loss in a weld zone by increasing the formation of carbides, it may be advisable, for example, in the device shown in FIG. 2, to inject carbon in a solid or gaseous form or in the form of a chemical compound through a nozzle. Thus, for example, CO and $CO_2$ molecules are dissociated at high temperatures, so that the carbon released in this manner is available for the desired formation of carbides. However, it is also possible to evaporate pulverized carbon by means of an arrangement shown in FIG. 3 and to supply the pure carbon vapor to the workpiece concentrically with the beam.

If the formation of carbides is to be avoided or suppressed, substances having an affinity to carbon, such as niobium, may be used. Thus, the substance 62 to be evaporated, for example, in the device shown in FIG. 5, may be pulverized niobium whose ions will produce the desired effect when they are accelerated to an appropriate speed on their way to the workpiece.

The examples shown in FIGS. 1-9 are intended exclusively to illustrate the basic idea of the present invention and should not be construed as limiting the applicability of the new machining process using radiant energy.

This invention may be variously modified and embodied within the scope of the subjoined claims.

What is claimed is:

1. The method of thermal machining of material which comprises directing a composite beam on said material at the desired position of machining, said beam comprising a first component to supply substantially all of the thermal energy necessary for machining and a second corpuscular beam component impinging upon the workpiece material to modify the physical properties of said material simultaneously with machining thereof.

2. The method in accordance with claim 1 in which said second component of said beam comprises particles injected into said first beam component and selected to react with the workpiece material at the surface being machined to modify the physical properties of said material.

3. The method in accordance with claim 1 in which said first component comprises a beam of electrons and in which said second component comprises particles injected into said electron beam.

4. The method in accordance with claim 1 in which said first component melts the surface of said workpiece material, and in which said second component of said beam comprises particles which react with the molten surface of said workpiece material to reduce the surface tension of said molten material.

5. The method in accordance with claim 1 in which said machining comprises welding of said material, and in which said first beam component penetrates into said material, and in which said second component comprises particles impinging upon the molten surface of the penetrated material to reduce the surface tension of said molten material.

6. The method in accordance with claim 1 in which the impinging thermal energy of said first component changes the physical properties of said material adversely and in which said second component of said beam comprises particles reacting with the workpiece material to compensate for said thermally induced changes in the workpiece material.

7. The method in accordance with claim 1 in which said machining comprises drilling, and in which said first component of said composite beam comprises electromagnetic radiation and in which said second component of said beam comprises particles injected into said first component to increase the vapor pressure at the point of impingement of said composite beam to increase the speed of drilling.

8. The method in accordance with claim 1 in which said machining comprises the welding of a steel workpiece, and in which said second component comprises particles of material which will react with the carbon in the workpiece along the weld seam to bind said carbon atoms in the weld zone.

9. The method in accordance with claim 8 in which said particles comprise niobium particles.

10. The method in accordance with claim 2 in which the carbide content of the workpiece material is to be inhibited or reduced during machining, and in which said second component of said beam comprises particles of carbon binding material.

11. The method in accordance with claim 1 in which said machining comprises machining of austenitic steel, and in which said second component of said beam comprises carbon to overcome hardness loss in said steel workpiece due to decomposition of carbides during the application of thermal energy thereto.

12. Apparatus for the thermal machining of materials by a composite beam comprising means for generating a first beam component and directing said first beam component onto a workpiece to supply substantially all the thermal energy necessary for machining, and means for injecting particles into said first beam component to form a second beam component impinging on said workpiece to modify the physical properties of said material simultaneously with machining thereof.

13. Apparatus in accordance with claim 12 in which the means for generating one beam component is inclined with respect to the surface of the workpiece, and in which means are provided for deflecting said beam component, and the means for generating said second beam component are so arranged that both beams impinge on the workpiece.

14. In an apparatus of claim 12 wherein said second component comprises neutral corpuscles and ions, and which includes means for causing a gas discharge at the position of injection of said particles of said two beam components to make possible adjustments of the proportion of ions to neutral corpuscles in accordance with the intensity of said gas discharge.

15. The apparatus of claim 12 in which said means for generating a second beam component comprises means for generating an ion beam.

16. Apparatus in accordance with claim 12 in which a beam of charged particles is used as a said first component, and which includes a focusing lens of short focal length provided for focusing said first component at a first focus, a long focus lens to image said focus on the workpiece, and means for injecting said particles into the first focus of said first component.

17. The apparatus of claim 12 including means for generating at least one magnetic field for deflecting selected types of charged particles present in said composite beam to avoid accumulation of undesired electric charges in said material during machining.

18. The apparatus of claim 12 including means for supplying additional slow electrons to said composite beam before it reaches said magnetic field to preliminarily reduce the concentration of positively charged particles in said composite beam.

References Cited by the Examiner

UNITED STATES PATENTS 3,056,881 10/1962 Schwarz.
3,084,037 4/1963 Smith.
3,117,022 1/1964 Bronson et al. ____ 204—192 X

OTHER REFERENCES

Steigerwald, German app. No. 1,033,816, pub. July 10, 1958.

Steigerwald, German app. No. 1,034,786, pub. July 24, 1958.

JOSEPH V. TRUHE, *Primary Examiner.*